(12) United States Patent
Lim et al.

(10) Patent No.: US 7,309,479 B2
(45) Date of Patent: Dec. 18, 2007

(54) COBALT OXIDE CATALYSTS

(75) Inventors: Myong Hoon Lim, Yongin (KR); Tae Hee Park, Seoul (KR); Jae Hoi Gu, Sungnam (KR); Yongho Yu, Sungnam (KR)

(73) Assignee: Samsung Engineering Co., Ltd., Seoul (KR)

( * ) Notice: Subject to any disclaimer, the term of this patent is extended or adjusted under 35 U.S.C. 154(b) by 147 days.

(21) Appl. No.: 11/160,571

(22) Filed: Jun. 29, 2005

(65) Prior Publication Data

US 2007/0004582 A1 Jan. 4, 2007

(51) Int. Cl.
*C01B 3/06* (2006.01)
*C09K 3/00* (2006.01)

(52) U.S. Cl. ............... 423/648.1; 252/182.32; 252/183.13; 252/183.14; 423/657

(58) Field of Classification Search ........... 502/325; 423/594.19, 286, 287, 288, 648.1, 657; 252/182.32, 252/183.13, 183.14
See application file for complete search history.

(56) References Cited

U.S. PATENT DOCUMENTS

| | | | | | |
|---|---|---|---|---|---|
| 2,570,882 | A | * | 10/1951 | Stiles | 264/654 |
| 4,093,450 | A | * | 6/1978 | Doyle et al. | 75/365 |
| 6,534,033 | B1 | * | 3/2003 | Amendola et al. | 423/648.1 |
| 6,939,529 | B2 | * | 9/2005 | Strizki et al. | 423/658.2 |
| 6,982,287 | B2 | * | 1/2006 | Wang et al. | 518/715 |
| 2002/0183405 | A1 | * | 12/2002 | Pederzani et al. | 518/715 |
| 2003/0144367 | A1 | * | 7/2003 | Jacobus Van Berge et al. | 518/715 |
| 2004/0242941 | A1 | * | 12/2004 | Green et al. | 568/910 |
| 2005/0232857 | A1 | * | 10/2005 | Lomax et al. | 423/652 |
| 2006/0013753 | A1 | * | 1/2006 | Vajo et al. | 423/286 |
| 2006/0046930 | A1 | * | 3/2006 | Au | 502/400 |
| 2006/0257313 | A1 | * | 11/2006 | Cisar et al. | 423/648.1 |

OTHER PUBLICATIONS

Risbud et al., "Wurtzite CoO", Chem. Mater. 2005, 17, 834-838, no month.
Kaufman and Sen, "Hydrogen Generation by Hydrolysis of Sodium Tetrahydroborate", J. Chem. Soc. Dalton Trans. 1985, 307-313, no month.
Kojima et al., "Hydrogen Generation using Sodium Borohydride Solution and Metal Catalyst coated on Metal Oxide", Int. J. Hydrogen Energy, 2002, 27, 1029-1034, no month.

* cited by examiner

*Primary Examiner*—Wayne A. Langel
(74) *Attorney, Agent, or Firm*—JHK Law; Joseph Hyosuk Kim

(57) ABSTRACT

The present invention provides unsupported and supported cobalt oxide catalysts and preparation method thereof, and its application for hydrogen generation from a metal borohydride solution. More particularly, provided are an activation method of a newly prepared catalyst and a regeneration method of a deactivated cobalt oxide catalyst.

13 Claims, 4 Drawing Sheets

COBALT OXIDE CATALYSTS

FIELD OF INVENTION

The present invention relates to a cobalt oxide catalyst for hydrogen generation from metal borohydride. The invention also relates to a method of making, sintering, activating a cobalt oxide catalyst, regenerating a deactivated cobalt oxide catalyst, and the use of the catalyst for oxidative reaction on various chemical systems.

BACKGROUND OF THE INVENTION

Cobalt oxides have gained much attention due to their potential applications in numerous areas of science and technology. Recently, the applications of cobalt oxides have been extensively investigated in the fields of catalysis, solid-state gas sensors, magnetic materials, electrochromic devices, and high-temperature solar collectors (Seshadri, R. et al., Chem. Mater. 2005, 17, 834-838). These interesting properties of the cobalt oxides result from their unique electronic structures and surface characteristics.

Cobalt oxides have been used as oxidation catalysts in several chemical processes. The catalytic activity of the cobalt oxides depends on preparation conditions, surface structures, degree of crystallization, oxidation states, surface area, and so on. The surface structures and compositions of the cobalt oxides play important roles for catalysis applications. It is often observed that the catalytic reaction using cobalt oxide takes place at elevated temperatures due to the activation of the catalyst and the acceleration of the reaction.

It has been known that hydrogen gas is generated by hydrolysis of sodium borohydride in the aid of acid, transition metals, or their salts (Kaufam, C. M. and Sen, B., J. Chem. Soc. Dalton Trans. 1985, 307-313). U.S. Pat. No. 6,534,033 discloses that transition metal catalyst for hydrogen generation may be obtained from a stabilized metal borohydride solution. Those metal catalysts, such as ruthenium, rhodium, or cobalt metal supported on various substrates exhibited high activity for hydrogen generation. Other metal catalysts, including silver, iron, nickel, copper, and so on are often inactive or less active for hydrogen generation at room temperature based on unpublished tests. Some metal catalysts such as copper and nickel, showed more activity after they were heated in nitrogen at 600-800 degree C. In addition, usage of high performance metal catalyst, such as ruthenium, rhodium or platinum is cost prohibitive for one-time use in various applications.

According to a recent publication (Kojima, Y. et al., Int. J. Hydrogen Energy, 2002, 27, 1029-1034), Toyota Central R&D Laboratories, Inc. reported that a catalyst containing platinum and $LiCoO_2$ has a high catalytic activity for hydrogen generation due to the synergistic effects of a finely divided platinum metal on the metal oxide framework. However, this system still uses a precious metal like platinum, which is not attractive for practical application due to high production cost. From a practical point of view, a high performance catalyst for hydrogen generation having low production cost is highly desirable.

SUMMARY OF THE INVENTION

The present invention provides both supported and unsupported cobalt oxide catalysts for the use of hydrogen generation from a metal borohydride solution. Also provided is a method for activating cobalt oxide catalysts and regenerating deactivated cobalt oxide catalysts.

The present invention also provides a method of making supported and unsupported cobalt oxide catalysts. The process of making unsupported catalysts comprises: shaping catalysts with wet cobalt metal paste or dry cobalt metal powder; thermal or hydrothermal oxidation of the catalysts; and sintering of the catalysts. Another route for making unsupported cobalt oxide catalysts is thermal decomposition of cobalt compounds. The process of making supported cobalt oxide catalysts comprises: impregnation of cobalt compounds on a substrate; the formation of cobalt oxide by thermal decomposition of the cobalt compounds. In another embodiment, the present invention provides that thermal oxidation of the cobalt metal coated on a substrate, which is prepared by an electroless plating or electroplating method.

The invention also provides a process of hydrogen generation comprising a cobalt oxide catalyst, a container of the catalyst, and a metal borohydride solution.

In one aspect, the present invention is directed to a cobalt oxide catalyst for hydrogen generation comprising $Co^{2+}$, $Co^{3+}$ oxidation state, or mixtures thereof. The cobalt oxide catalyst may comprise $CoO$, $Co_2O_3$, $Co_3O_4$, or mixtures thereof. The cobalt oxide catalyst may be in unsupported form, which may be optionally in the form of powder, chip, disk, rod, wire, mesh, bead, monolith, strip with porosity, or strip without porosity. The cobalt oxide catalyst may be in contact to a support and in one embodiment, the support may be metals, ceramics, polymers, glass, fibers, fabrics, textiles, wovens, nonwovens, fibers, alloys, zeolites, molecular sieves, ion exchange resins, graphite, metal oxide, metal carbide, metal boride, metal nitride, or mixtures thereof.

In another aspect, the invention is also directed to a method of making the cobalt oxide catalyst from a cobalt metal comprising heating the cobalt metal in a temperature of about 200 to about 1200 degrees Centigrade. The heating may be by thermal oxidation, hydrothermal oxidation, or steam oxidation of cobalt metal. The oxidizing and sintering of the cobalt oxide prepared from cobalt metal may be carried out in a microwave oven, an electric high temperature furnace, an electric heating oven, a heat gun, a hot plate, or a combination thereof.

The invention is further directed to a method of making the cobalt oxide catalyst from a cobalt compound comprising decomposing the cobalt compound by heating. In one aspect, the cobalt compound may be cobalt chloride, cobalt nitrate, cobalt carbonate, cobalt hydroxide, cobalt borate, cobalt acetate, cobalt oxalate, or an organometallic compound containing cobalt. The method may also comprise a pyrolysis process and/or a glycine nitrate process in air.

The invention may also include a process of hydrogen generation using the cobalt oxide catalyst, comprising contacting the cobalt oxide catalyst with a solution comprising metal borohydride, a base, and proton donor solvent. The metal borohydride may be lithium borohydride, sodium borohydride, potassium borohydride, ammonium borohydride, tetramethyl ammonium borohydride, or mixtures thereof. The base may be lithium hydroxide, sodium hydroxide, potassium hydroxide, ammonium hydroxide, sodium sulfide, sodium zincate, sodium gallate, sodium silicate, or mixtures thereof. The proton donor solvent may be water, alcohol, ethylene glycol, glycerol, methanol, ethanol, isopropanol, isobutanol, propanol, propanediol, butanol, or mixtures thereof.

In still another aspect, the invention may also include a method of regenerating deactivated cobalt oxide catalyst for hydrogen generation comprising: (a) sonicating the catalyst in deionized (DI) water; (b) washing the catalyst with DI water; and (c) heating the catalyst at about 200-1200 degree C. The heating may be accomplished by a microwave oven, a high temperature furnace, an electric heating oven, a heat gun, a hot plate, or a combination thereof.

BRIEF DESCRIPTION OF THE DRAWINGS

The present invention will become more apparent to those of ordinary skill in the art by describing in detail preferred embodiment thereof with reference to the attached drawings in which.

DETAILED DESCRIPTION OF THE INVENTION

Figure 1:
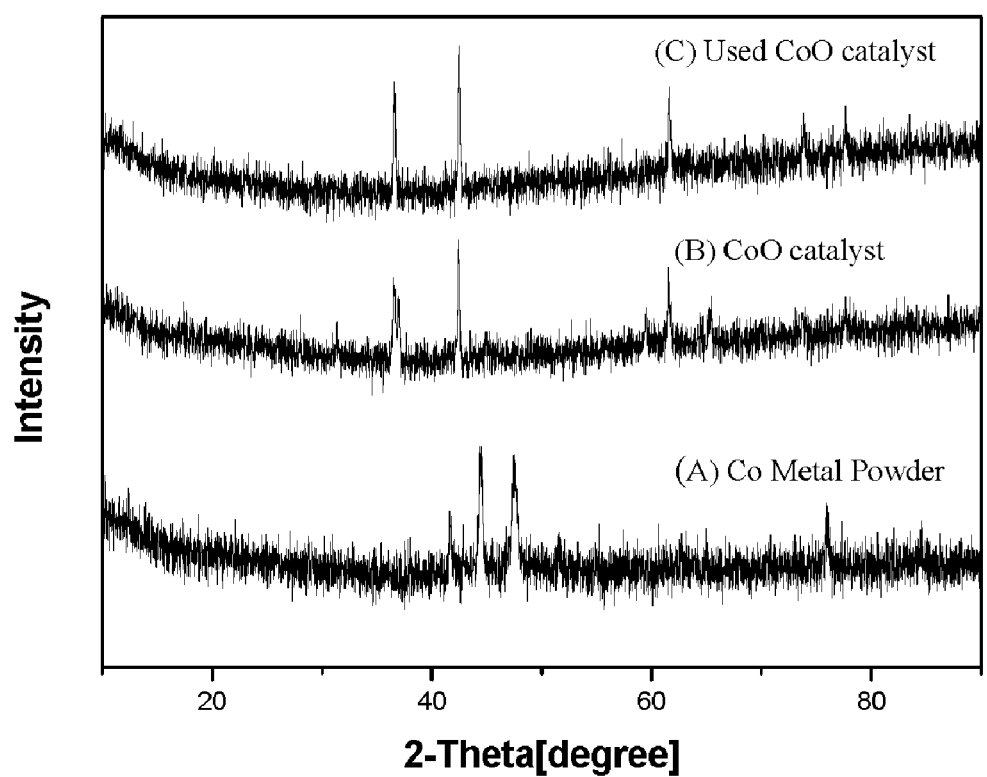
FIG. 1 shows the X-ray diffraction patterns of (A) cobalt metal powder purchased from Kanto Chemical Co. Inc. and (B) cobalt oxide catalyst before catalysis according to the present invention, (C) cobalt oxide catalyst after catalysis according to the present invention.
Figure 2:
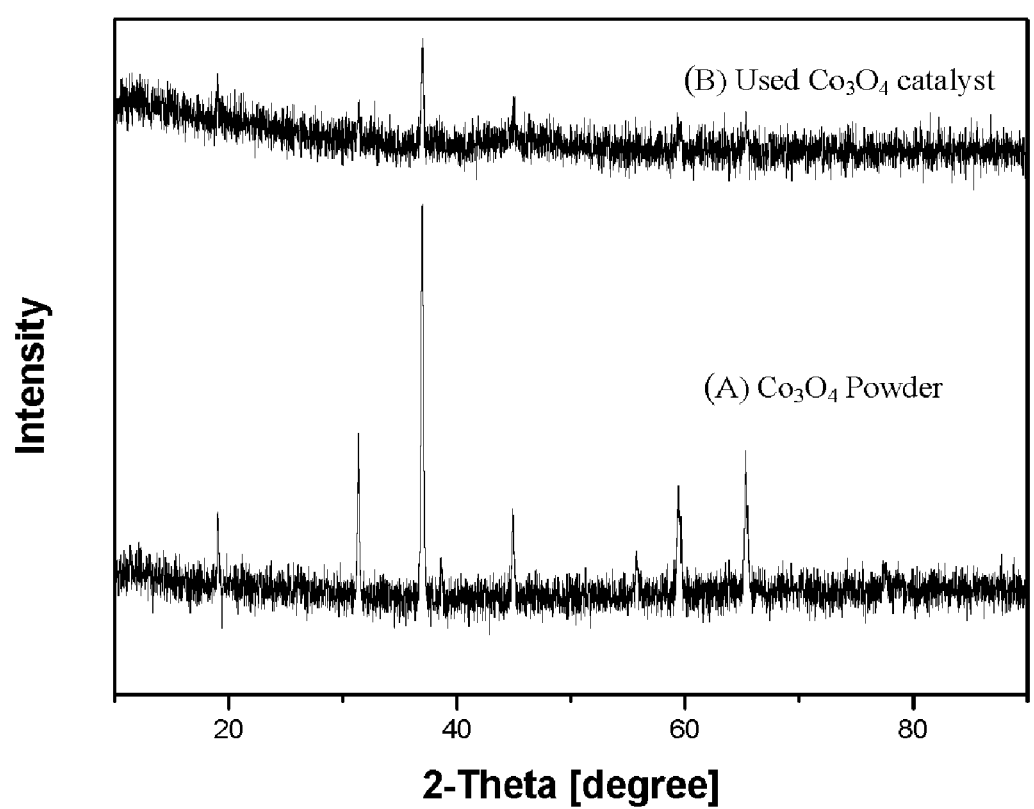
FIG. 2 shows the X-ray diffraction patterns of (A) cobalt oxide ($Co_3O_4$) powder purchased from Sigma-Aldrich and (B) the cobalt oxide catalysts according to the present invention.

The present invention is directed to provide a cost-effective cobalt oxide catalyst for hydrogen generation having a high performance catalytic activity. The present invention also provides a method of making a supported and an unsupported cobalt oxide catalyst and a process of hydrogen generation.

The present invention will now be described more fully hereinafter with reference to the accompanying figures, in which preferred embodiments of the invention are shown. This invention may, however, be embodied in different forms and should not be construed as limited to the embodiments set forth herein.

The cobalt oxide herein refers to, but not particularly limited to, a cobalt oxide comprising $Co^{2+}$, $Co^{3+}$ oxidation states, and mixtures thereof. More specifically, the cobalt oxide may be CoO, $Co_2O_3$, $Co_3O_4$, and mixtures thereof. The cobalt oxide catalyst can have a form of powder, wire, chip, disk, rod, strip, bead, monolith with/without porosity, or cobalt oxide particles supported on a substrate comprising metals, ceramics, polymers, glass, fibers, fabrics, textiles, wovens, nonwovens, fibers, alloys, zeolites, molecular sieves, ion exchange resins, graphite, metal oxide, metal carbide, metal boride, metal nitride, and mixtures thereof.

The preparation of cobalt oxide may be carried out using a method of thermal or hydrothermal oxidation of cobalt metal or a decomposition process of a variety of cobalt compounds. An unsupported cobalt oxide catalyst is prepared by thermal oxidation of cobalt metal in an oxidative environment such as air or ozone. The temperature of thermal oxidation typically is in the range of 200~1200 degree C. (preferably 400~800 degree C). The color of oxidized cobalt metal is an indication of its degree of oxidation, which exhibits brown or grayish black depending on the oxidation states. The simplest way to make cobalt oxide is to use microwave heating in the air. The microwave heating process not only oxidizes cobalt metal powder, but also sinters the metal particles within 0.5-10 minutes depending on the power of the microwave. The result of X-ray diffraction analysis (FIG. 1B) on the product after the microwave heating illustrates that the resulting product has a cobalt(II) oxide (CoO) phase. In addition, the CoO phase of the product was not changed after catalytic reaction of hydrogen generation in a sodium borohydride solution.

Another way of making cobalt oxide is by the heating of cobalt metal in an electric furnace at a temperature of 200~1200 degree C. (preferably 400~800 degree C.) in the air or ozone for 10 minutes to 12 hours (preferably 1 to 2 hours). Cobalt oxide also can be prepared by hydrothermal oxidation or steam oxidation of cobalt metal. These processes may take more time to complete compared with the microwave heating process, and often require additional thermal treatments for the use of catalyst for hydrogen generation.

Another embodiment of the invention is to make cobalt oxide catalyst by thermal decomposition of cobalt compounds. Precursors of cobalt oxide catalysts may be without limitation, cobalt chloride, cobalt nitrate, cobalt carbonate, cobalt hydroxide, cobalt borate, cobalt acetate, cobalt oxalate, and organometallic compound containing cobalt. For the preparation of cobalt powder with high surface area, a glycine-nitrate method is employed. The size and porosity of cobalt oxide particles can be controlled by adjusting the amount of glycine.

A supported cobalt oxide catalysts is prepared through a decomposition process of a cobalt compound that is bound to, entrapped within, and coated on a substrate comprising metals, ceramics, polymers, glass, fibers, fabrics, textiles, wovens, nonwovens, fibers, alloys, zeolites, molecular sieves, ion exchange resins, graphite, metal oxide, metal carbide, metal boride, metal nitride, and mixtures thereof. Another preparation method of a supported catalyst is the oxidation of coated cobalt metal on a substrate by heating in the air or ozone. Coating of cobalt metal on a substrate can be achieved by electroplating or electrodeless plating A process of hydrogen generation according to the present invention is initiated by contacting a cobalt oxide catalyst with a solution comprising metal borohydride, a base, and proton donor solvent. A base used herein plays a role to stabilize metal borohydride in a solution. A common base used in a metal borohydride solution is lithium hydroxide, sodium hydroxide, potassium hydroxide, ammonium hydroxide, sodium sulfide, sodium zincate, sodium gallate, sodium silicate, and mixtures thereof. Hydrogen generation from a metal borohydride solution results from solvorolysis of metal borohydride by proton donor solvent. Thus, any proton donor solvents can be used for the solvorolysis of metal borohydride. The preferred solvent is water and any alcohol comprising without limitation, ethylene glycol, glycerol, methanol, ethanol, isopropanol, isobutanol, propanol, propanediol, butanol, and mixtures thereof. Another process of hydrogen generation starts by mixing a proton donor solvent with a solid system comprising a cobalt oxide catalyst and solid metal borohydride. Hydrogen generation of this process may be controlled by the amount of the added solvent to a solid mixture of the cobalt oxide catalyst and metal borohydride.

Figure 3:
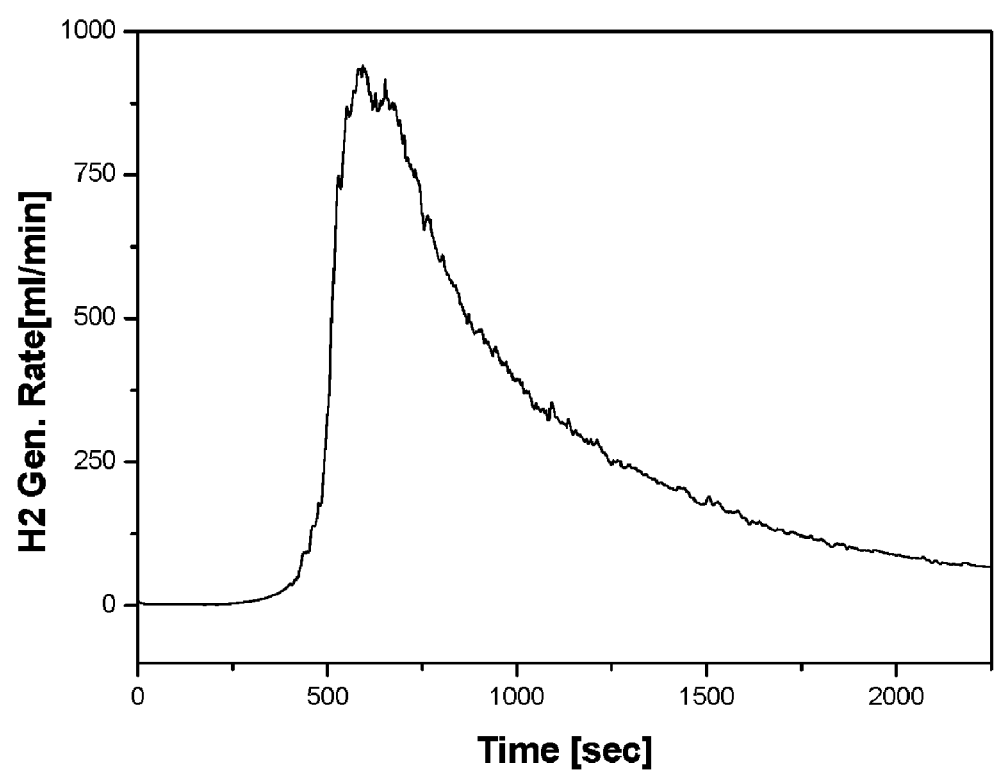
FIG. 3 shows a graph of hydrogen flow rate versus time for catalytic reaction of hydrogen generation using cobalt oxide (CoO) according to the present invention.
Figure 4:
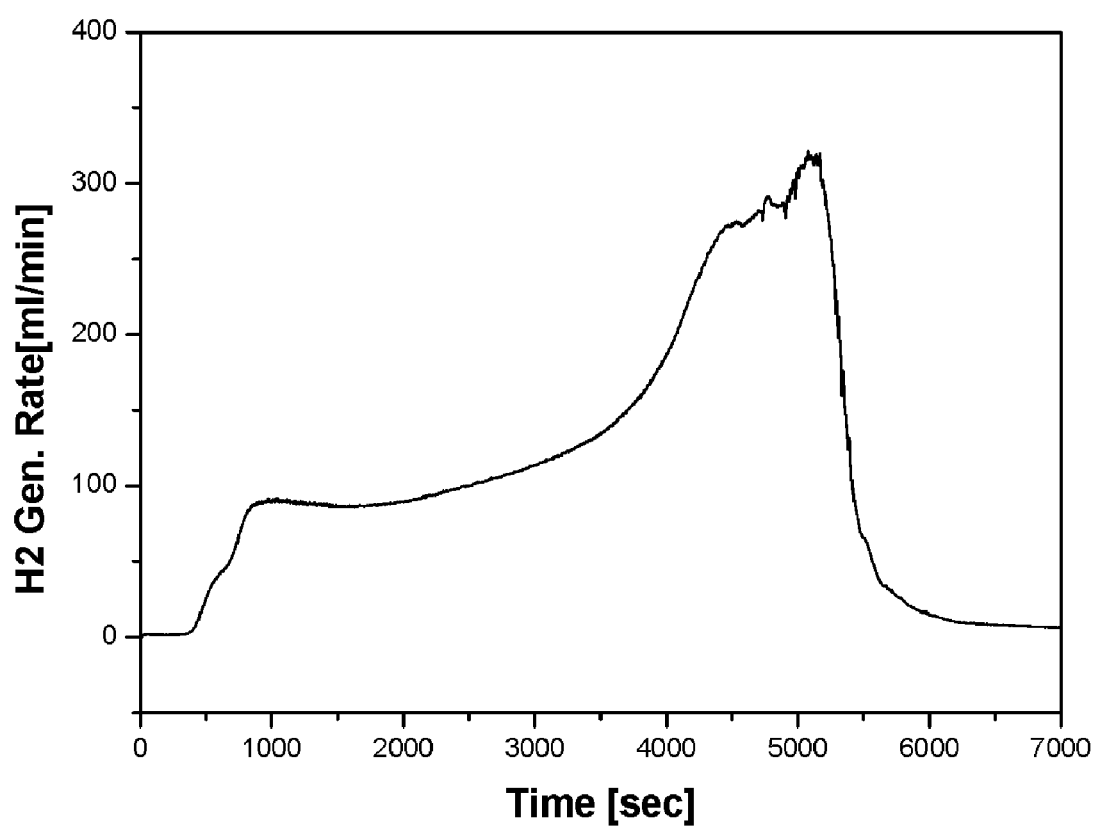
FIG. 4 shows a graph of hydrogen flow rate versus time for catalytic reaction of hydrogen generation using a commercial cobalt oxide ($Co_3O_4$) purchased from Sigma-Aldrich.

It often takes a few minutes to generate a hydrogen gas from a metal borohydride solution when a freshly made cobalt oxide catalyst is employed. The surface activation is engaged by immersion of the catalyst in a metal borohydride solution for 5~30 minutes. Once the catalyst is activated, an instant increase of hydrogen is observed. To accelerate the surface activation of the freshly made cobalt oxide, heating is required. The preferred heating temperature range is 30~100 degree C. (preferably 400~800 degree C.). However, the activation process is not necessary unless the process of hydrogen generation needs immediate action. The plots of hydrogen flow rate vs. time of CoO and $Co_3O_4$ catalysts are shown in FIG. 3 and FIG. 4, respectively. In the case of the CoO catalyst according to the present invention, the hydrogen flow rate hit a peak of 916 ml/min within 12 minutes. On the other hand, the $Co_3O_4$ catalyst purchased from Sigma-Aldrich revealed the abrupt increase of the flow rate after 6 minutes and stayed for a while before hitting the maximum point of 316 ml/min at 85 minutes. The differences of these two phenomena on hydrogen generation may result from several factors including particle size, the amount of catalyst, surface compositions and structures, oxidation states, and so on. However, the plots of both the CoO and $Co_3O_4$ catalysts showed similar pattern to FIG. 3 in consecutive uses for hydrogen generation.

After several uses of the cobalt oxide catalyst, its catalytic activity declines due to surface contamination. The deactivated cobalt oxide catalyst can be re-activated through the following process: (1) sonicating the catalyst in deionized (DI) water; (2) rinsing the catalysts with DI water several times; and (3) heating the catalyst in a hot plate, a microwave oven or an electric furnace at 200~1200 degree C. (preferably 400~800 degree C.).

This invention is more specifically illustrated by following Examples, which are not meant to limit the invention.

EXAMPLES

Example 1

Preparation of an Unsupported Cobalt Oxide Catalyst in a Microwave Oven

A cobalt oxide catalyst was prepared by thermal oxidation of cobalt metal powder in a microwave oven for 10 minutes. The power of the microwave was set to 950 W. Upon generating the microwave, the cobalt metal powder started glowing red-hot within a minute. The microwave heating of the sample continued for 10 minutes. After completion of the heating, the resulting sample showing grayish black was consolidated. The consolidated sample was crushed for the X-ray diffraction (XRD) analysis. FIG. 1 (B) shows a XRD pattern of synthesized cobalt oxide sample in a microwave oven, which displays a different XRD pattern of Co metal, indicating a cobalt oxide CoO phase. The CoO phase was confirmed by comparing a reference XRD pattern of CoO found in a PDF (powder diffraction file) database. FIG. 1 (C) shows the XRD pattern of the cobalt oxide sample after use in hydrogen generation reaction and confirms the unchanged CoO phase.

Example 2

Preparation of a Shaped Unsupported Cobalt Oxide Catalyst in a Microwave Oven

A paste of cobalt metal was prepared by mixing cobalt metal powder with deionized (DI) water. The cobalt paste was spread out flat on a ceramic plate and chopped into 2-3 mm pieces. The shaped paste was dried and heated in a microwave oven with a power of 950 W for 10 minutes.

Example 3

Preparation of an Unsupported Cobalt Oxide Catalyst in a High Temperature Furnace Cobalt metal powder contained in an alumina crucible was placed in a high temperature furnace and heated at 800 degree C. for 2 hours in air. The resulting sample was oxidized and sintered simultaneously.

Example 4

Preparation of an Unsupported Cobalt Oxide Catalyst using a Glycine-Nitrate Combustion Process Fine powder of cobalt oxide was synthesized using a glycine-nitrate process. In this process, an aqueous solution containing glycine and cobalt nitrate hexahydrate ($Co(NO_3)_2$-$H_2O$) was prepared and heated until excess water had boiled away. Continuous heating of the remaining material resulted in self-ignition, which generated fine black powder. The molar ratios of glycine and cobalt nitrate in this invention were 1:1 and 1:2.

Example 5

Preparation of a Supported Cobalt Oxide Catalyst using a Glycine-Nitrate Combustion Process 1.0 g of cobalt nitrate hexahydrate ($Co(NO_3)_2$-$H_2O$) was dissolved in 2 ml of DI water. The resulting solution was introduced into a 100 ml beaker, into which 3 g of molecular sieves (Yakuri Pure Chemicals Co. LTD, Osaka, Japan). The cobalt ion impregnated molecular sieves were dried in an oven at 100 degree C. for 1 hour, and consecutively heated on a hot plate with a maximum temperature setting for 1 hour.

Example 6

Hydrogen Generation Experiments

Hydrogen generation experiments were carried out to measure a flow rate of hydrogen. Two types of cobalt oxides (CoO and $Co_3O_4$) were employed. While a CoO sample was prepared in Example 1, a $Co_3O_4$ sample was purchased from Sigma-Aldrich. The experiment was carried out by adding 30 ml of a sodium borohydride solution containing 16 wt. % $NaBH_4$, 3.5 wt. % NaOH, and 80.5 wt. % of DI water to a reaction vessel containing 300 mg of cobalt oxide chips. The hydrogen flow rate was measured using a mass flow controller interfaced with a personal computer. FIG. 3 shows a graph of the hydrogen flow rate of the CoO catalyst. In case of a $Co_3O_4$ catalyst, 20 mg of a fine powder (~10 micron) sample was used for the hydrogen generation experiment. The other conditions were the same as the above experiment with the CoO catalyst. FIG. 4 shows a graph of hydrogen flow rate.

All of the references cited herein are incorporated by reference in their entirety.

Those skilled in the art will recognize, or be able to ascertain using no more than routine experimentation, many equivalents to the specific embodiments of the invention specifically described herein. Such equivalents are intended to be encompassed in the scope of the claims.

What is claimed is:

1. A composition comprising metal borohydride aqueous solution and cobalt oxide catalyst for hydrogen generation.

2. The composition of claim 1, wherein the cobalt oxide catalyst comprises CoO, $Co_2O_3$, $Co_3O_4$, or mixtures thereof.

3. The composition of claim 1, wherein the cobalt oxide catalyst is in unsupported form.

4. The composition of claim 3, wherein the cobalt oxide catalyst is in the form of powder, chip, disk, rod, wire, mesh, bead, monolith, strip with porosity, or strip without porosity.

5. The composition of claim 1, wherein the cobalt oxide catalyst is in contact with a support.

6. The composition of claim 5, wherein the support is selected from the group consisting of: metals, ceramics, polymers, glass, fibers, fabrics, textiles, wovens, nonwovens, fibers, alloys, zeolites, molecular sieves, ion exchange resins, graphite, metal oxide, metal carbide, metal boride, metal nitride, and mixtures thereof.

7. The composition of claim 1, wherein the metal borohydride is selected from the group consisting of: lithium borohydride, sodium borohydride, potassium borohydride, ammonium borohydride, tetramethyl ammonium borohydride, and mixtures thereof.

8. The composition of claim 1, wherein the metal borohydride aqueous solution comprises metal borohydride, a base, and water.

9. The composition of claim 8, wherein the base is selected from the group consisting of: lithium hydroxide, sodium hydroxide, potassium hydroxide, ammonium hydroxide, sodium sulfide, sodium zincate, sodium gallate, sodium silicate, and mixtures thereof.

10. A process of hydrogen generation using the composition of claim 1, comprising contacting the composition with a base and a proton donor solvent.

11. The process of hydrogen generation of claim 10, wherein the metal borohydride of said composition is selected from the group consisting of: lithium borohydride, sodium borohydride, potassium borohydride, ammonium borohydride, tetramethyl ammonium borohydride, and mixtures thereof.

12. The process of hydrogen generation of claim 10, wherein the base is selected from the group consisting of: lithium hydroxide, sodium hydroxide, potassium hydroxide, ammonium hydroxide, sodium sulfide, sodium zincate, sodium gallate, sodium silicate, and mixtures thereof.

13. The process of hydrogen generation of claim 10, wherein the proton donor solvent is selected from the group consisting of: water, alcohol, ethylene glycol, glycerol, methanol, ethanol, isopropanol, isobutanol, propanol, propanediol, butanol, and mixtures thereof.

* * * * *